United States Patent
Johnston et al.

[11] Patent Number: 5,620,028
[45] Date of Patent: Apr. 15, 1997

[54] BRAKE MODULE WITH INTEGRATED ACCUMULATOR

[75] Inventors: Gary L. Johnston, Pleasant Hill; James W. Zehnder, II, Huber Heights; Richard E. Longhouse, Dayton; William C. Kruckemeyer, Beaver Creek; Michael L. Oliver, Xenia, all of Ohio

[73] Assignee: General Motors Corporation, Detroit, Mich.

[21] Appl. No.: 407,122

[22] Filed: Mar. 20, 1995

[51] Int. Cl.⁶ .................. F16L 55/04; B60T 8/34
[52] U.S. Cl. .................. 138/31; 138/30; 303/113.1; 303/116.4
[58] Field of Search .................. 138/30, 31; 303/64, 303/116.4, 113.1; 60/548, 413, 415, 416

[56] References Cited

U.S. PATENT DOCUMENTS

| | | | |
|---|---|---|---|
| 3,077,898 | 2/1963 | Raymond | 138/31 |
| 3,264,671 | 8/1966 | Carpenter | 60/415 |
| 3,889,467 | 6/1975 | Huffman et al. | 60/548 |
| 3,993,361 | 11/1976 | Stelzer | 303/64 |
| 4,123,117 | 10/1978 | Adachi | 60/548 |
| 4,201,522 | 5/1980 | Toyota et al. | 138/31 |
| 4,217,758 | 8/1980 | Bach et al. | 138/31 |
| 4,220,173 | 9/1980 | O'Brien | 138/31 |
| 4,546,846 | 10/1985 | Myers | 180/287 |
| 4,651,781 | 3/1987 | Kandelman | 138/30 |
| 4,674,287 | 6/1987 | Ishimori et al. | 60/416 |
| 4,738,595 | 4/1988 | Gaiser | 417/36 |
| 4,878,519 | 11/1989 | Berding et al. | 138/31 |
| 4,929,037 | 5/1990 | Farr | 303/116.4 |
| 4,966,200 | 10/1990 | Bents | 138/31 |
| 5,024,250 | 6/1991 | Nakamura | 138/31 |
| 5,236,253 | 8/1993 | Glasmacher | 303/116.4 |
| 5,379,593 | 1/1995 | Ishiwata | 60/413 |
| 5,466,055 | 11/1995 | Schmitt et al. | 303/116.4 |

*Primary Examiner*—David Scherbel
*Assistant Examiner*—James F. Hook
*Attorney, Agent, or Firm*—Jeffrey A. Sedlar

[57] ABSTRACT

A brake module including an integrally formed manifold and accumulator provides a way of simplifying assembly, increasing packaging flexibility and reducing the total number of individual components.

6 Claims, 1 Drawing Sheet

5,620,028

BRAKE MODULE WITH INTEGRATED ACCUMULATOR

BACKGROUND OF THE INVENTION

The present invention relates to vehicle brake modules. More specifically, a brake module with an associating accumulator and a method of making a brake module with the accumulator integrated therewith is disclosed.

In a conventional fluid brake system a source of pressurized braking fluid is an essential element. The pressurized fluid is generally provided by means of a manually actuated master cylinder or an automatically driven pump. Accumulators have found use in both types of systems for providing fluid during brake apply cycles. Accumulators also provide a point of accumulation for fluid during brake release cycles in systems with anti-lock functions.

When an accumulator is used in a braking system it is generally provided as a separate component. Providing the accumulator separately increases the number of individual parts and connections in a brake module assembly and is generally associated with additional space requirements limiting the packaging options of the module. It would be preferable if the weight, physical size and assembly costs of conventional type brake module and accumulator assemblies could be reduced. Therefore, a need exists to provide additional assembly options for an accumulator when used in association with a brake system's modulator.

SUMMARY OF THE INVENTION

The present invention provides a brake system module with an integrated accumulator assembly. The module includes a manifold having a system of communicative passageways adapted to communicate with preferred system components such as valves, a pump, and the like. The manifold includes an accumulator integrally formed therewith, including a bore formed in the manifold such as to communicate with the system of communicative passageways.

A piston is slidably positioned in the bore such that on one side of the piston a gas-charged, pressurized chamber exists. On the other side of the piston, an expandable fluid chamber exists wherein fluid is permitted to communicate with the system of communicative passageways in the manifold. The accumulator is gas charged to a pressure relating to the braking system's operating pressure and is provided with a sufficient volume to meet the requirements of the braking system.

During brake system operation, when increasing fluid pressure communicates into the fluid chamber, the piston moves to compress the gas chamber. When pressure drops in the manifold, the gas chamber re-expands and forces fluid to communicate out of the fluid chamber.

The present invention also provides a method of making a brake system module with an integrated accumulator assembly. Preferably, the manifold is formed as an aluminum extrusion with the accumulator bore being part of the extrusion. In this preferred method of construction the bore is subsequently machined as required and finished, such as through a burnishing operation, to an acceptable surface finish condition. Subsequently, the piston is assembled into the bore with the required seals and is maintained therein by two end plugs inserted and held in place by retainers.

By providing an accumulator integrally formed within the module's manifold the part count, number of external connections, package size, and mass of the module can be minimized. A means of providing a close connection between the pump and the accumulator results, which acts to attenuate pump output noise levels. Additionally, providing a means of integrating an accumulator that is gas charged permits benefitting from the volumetrically efficient operation of compressed gas.

DETAILED DESCRIPTION OF THE PRESENTLY PREFERRED EMBODIMENT

Figure 1:
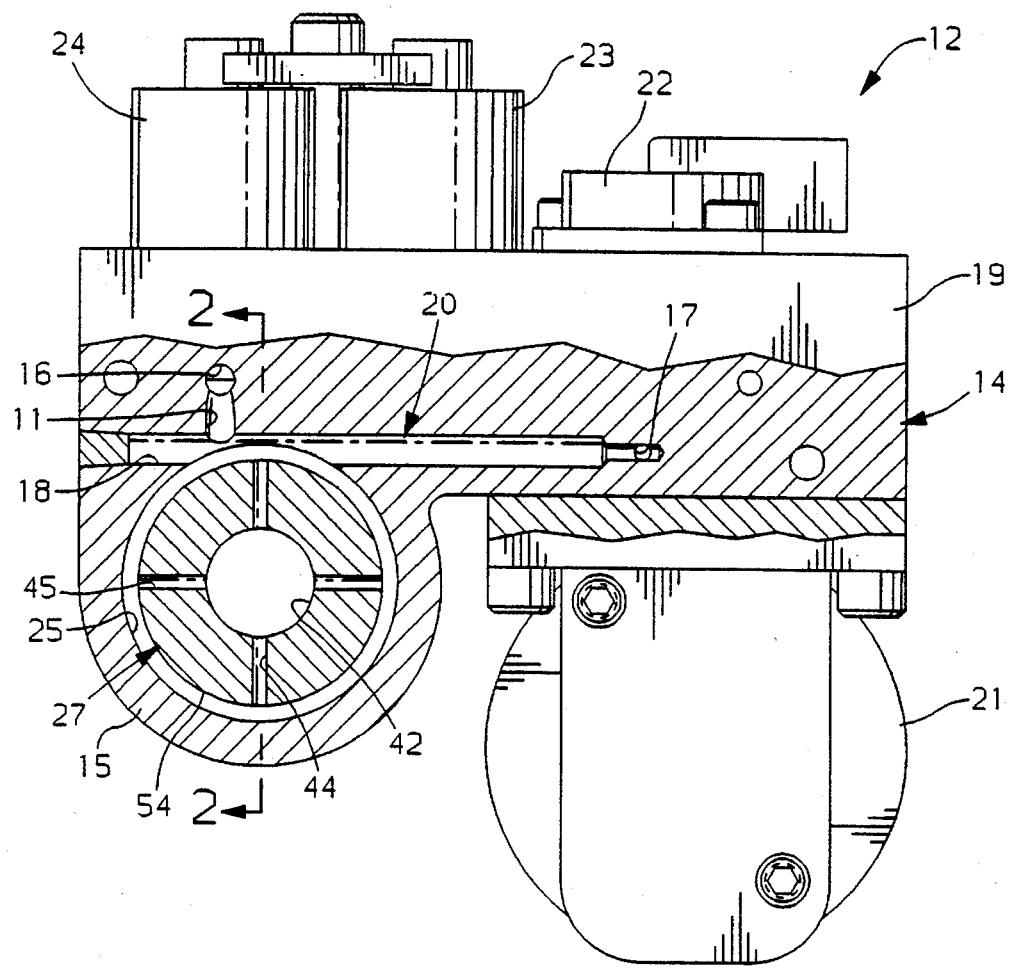
FIG. 1 is a fragmentary cross sectional view of a brake module with an integral accumulator.

Referring to the drawings, illustrated in FIG. 1 is a brake module 12 incorporating features of the present invention. Brake module 12 is generally assembled upon a base provided by the manifold 14 which comprises a body 19 of an acceptably rigid material such as metal with a system of communicative passageways 20 formed therein. Manifold 14 provides means for mounting conventional system components 21–24 such as valves, flow control means, a pump, and the like, such that the module 12 is assembled in a functional and convenient manner.

Integrally formed with body 19 is accumulator wall 15. In the present embodiment, body 19 and wall 15 are simultaneously formed by conventionally known aluminum extrusion processing with accumulator bore 25 being generally formed as part of the extrusion. After extrusion, the manifold 14 is cut to length and the bore 25 is subsequently machined and finished by burnishing to a surface finish tolerance of approximately 8–16 microns. Additionally, the system of communicative passageways 20 and the appropriate interfacing requirements for system components 21-24 are formed in the body 19.

Figure 2:
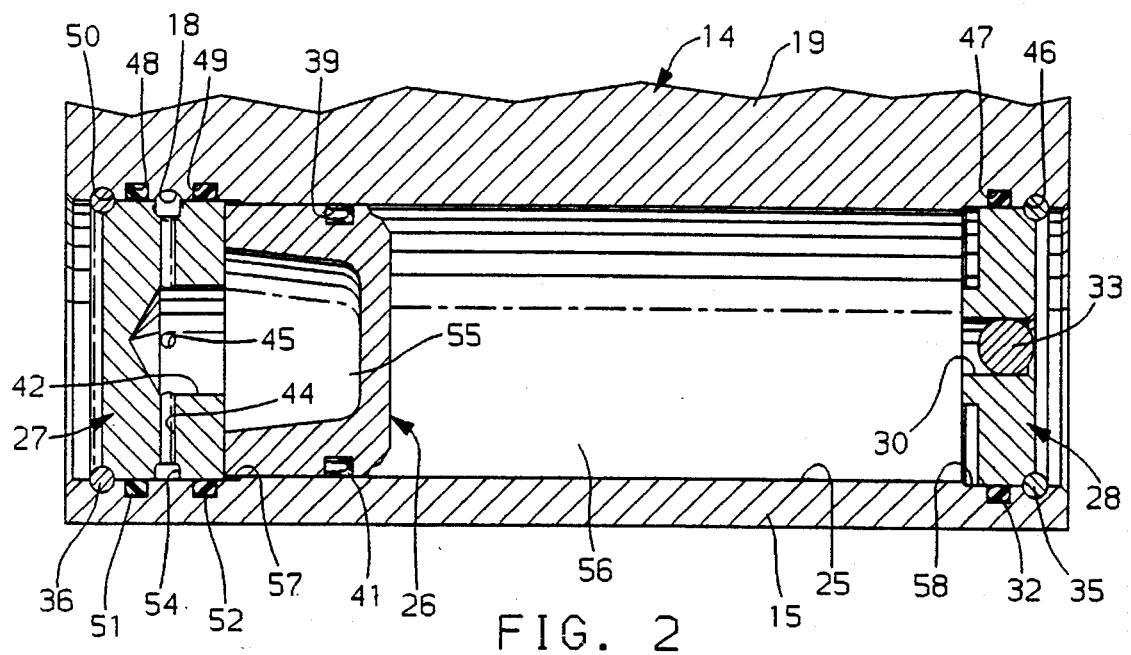
FIG. 2 is a sectional view taken generally through the plane indicated by the line 2—2 in FIG. 1.

Referring additionally to FIG. 2, the individual elements of accumulator 10, as assembled in the bore 25, are more readily apparent. The machining of bore 25 includes forming annular grooves 46–50 and steps 57–58 circumferentially around the surface of bore 25. Grooves 46 and 50 present a semi-circular open cross sectional open area while grooves 47–49 present a rectangular open cross sectional area.

Elastomeric seals 51 and 52 are positioned in grooves 48 and 49 and end plug 27 is positioned in bore 25 adjacent step 57 such that it engages seals 51 and 52 to prevent fluid flow there-past. End plug 27 is maintained within the bore 25 by retaining ring 36 which snap-fittingly engages into groove 50.

At the opposite end of bore 25 from end plug 27, seal 32 is positioned in groove 47 and end plug 28 is positioned in bore 25 adjacent step 58 such that it engages seal 32 to prevent gas flow there-past. End plug 28 is maintained within the bore 25 by retaining ring 35 which snap-fittingly engages groove 46.

A piston 26, including an annular seal 41 maintained in annular groove 39, is slidably carried in the bore 25 between end plugs 27 and 28 such that fluid chamber 55 is provided in bore 25 between end plug 27 and piston 26 and gas chamber 56 is provided in bore 25 between piston 26 and end plug 28. Annular seal 41 prevents the intercommunication of operating fluid from fluid chamber 55 with pressurized gas from gas chamber 56.

End plug 28 includes charging passage 30 which provides a means for pressurizing gas chamber 56 with a gas charge of a magnitude relating to the system's operating pressure. Charging passage 30 is permanently sealed by pressed-in ball 33. Optionally, a conventionally known gas-charging valve (not illustrated) may be provided in charging passage 30.

Fluid chamber 55 is in communication with the system of communicative passageways 20 through end plug 27. End plug 27 therefore, includes bore 42 which extends partially, longitudinally through end plug 27 and is intersected by cross bores 44 and 45 which extend laterally through end plug 27. End plug 27 also includes annular groove 54 which extends circumferentially there-around and provides a means of communication between cross bores 44 and 45 and bore 18 of manifold 14 regardless of the angular orientation of end plug 27. Bore 18 communicates with bore 16 through bore 11, and with bore 17 such that a means of communication with system components 21–24, as required for operation of the module 12, is provided.

To assemble the module 12, the first step is formation of the manifold 14. Manifold 14 of the present embodiment is formed by conventional extrusion means whereby, body 19 and accumulator wall 15 are simultaneously extruded providing a rough bore for bore 25. Then the grooves 46–50, steps 57–58 and the surface of bore 25 are machined. The surface of bore 25 is finished by burnishing. Additionally, the system of communicative passageways are machined into body 19 such that at least one segment thereof communicates with bore 25. The appropriate openings and connection means for system components 21–24 are machined into body 19.

Assembly of the module includes positioning the piston 26, with seal 41 placed in groove 39, into bore 25. The seals 51 and 52 are positioned in grooves 48 and 49, and end plug 27 is positioned in bore 25 near step 57 and fixed therein by placement of retaining ring 36 in groove 50. Additionally, seal 32 in positioned in groove 47 and end plug 28 is positioned in bore 25 near step 58 and fixed therein by placement of retaining ring 35 in groove 46.

After assembly of the accumulator components, a gas charge is introduced into gas chamber 56 through charging passage 30 by conventional means. Plug 33 is pressed into and seals charging passage 30.

By means of the present invention a brake module having an integrated manifold and gas chargeable accumulator assembly is provided through a non-complex method such that a compact manifold is provided with improved packageability.

What is claimed is:

1. A brake module comprising:
   a manifold having a body and having a system of communicative passageways extending at least partially through the body;
   a valve mounted on the manifold; and
   an accumulator formed with the manifold including a bore formed in the manifold by a wall and the body, the bore communicating with the system of communicative passageways, a piston slidably retained in the bore and a sealed gas charging passage communicating with the bore;
   wherein the manifold is formed by a process including the steps of:
   extruding the manifold with the body and the wall formed together so that the bore extends completely through the manifold and has a constant diameter;
   cutting the manifold to a predetermined length; and
   finishing the bore.

2. A brake module according to claim 1 further including the step of machining a first and a second groove in the manifold within the bore wherein the accumulator includes first and second end plugs removably fixed in the bore on alternate sides of the piston, the first end plug removably fixed in the bore by a first retaining ring positioned in the first groove and the second end plug removably fixed in the bore by a second retaining ring positioned in the second groove.

3. A brake module according to claim 2 wherein a first chamber communicating with the sealed gas charging passage is defined in the bore between the first end plug and the piston wherein the first chamber is sealed.

4. A brake module according to claim 3 wherein a second chamber communicating with the system of communication passageways is defined in the bore between the piston and the second end plug.

5. A brake module according to claim 4 further comprising a third groove formed in the manifold within the bore, a first seal positioned in the third groove, a fourth groove formed in the manifold within the bore and a second seal positioned in the fourth groove, wherein the second end plug includes a longitudinal bore communicating with the second chamber, a cross bore communicating with the longitudinal bore and an annular groove formed around the second end plug, the annular groove communicating with the system of communicative passageways wherein the second end plug engages the first and second seals and the annular groove communicates with the system of communicative passageways between the first and second seals.

6. A brake module comprising:
   an extruded manifold having an internal system of communicative passageways;
   a bore formed in the manifold during extrusion extending completely through the manifold and having a substantially constant diameter;
   a piston slidably and sealingly carried in the bore and separating the bore into a first chamber and a second chamber;
   a first end plug positioned in the bore adjacent the first chamber having a sealed gas charging passage communicating with the first chamber so that the first chamber carries a gas charge;
   a second end plug positioned in the bore adjacent the second chamber such that the second chamber is defined between the second end plug and the piston, the second end plug having an annular groove communicating with the system of communicative passageways, a longitudinal bore communicating with the second chamber and a cross bore communicating between the annular groove and the longitudinal bore so that the system of communicative passageways communicates with the second chamber through the second end plug and the piston is movable to expand the second chamber by compressing the gas in the first chamber.

\* \* \* \* \*